Patented Oct. 19, 1954

2,692,207

UNITED STATES PATENT OFFICE 2,692,207

THERMOPLASTIC COMPOSITIONS PLASTICIZED WITH A SULFONYL BIS ALKYL ACETATE

Edward S. Blake, Lexington, Mass., assignor to Monsanto Chemical Company, St. Louis, Mo., a corporation of Delaware No Drawing. Application December 29, 1950,
Serial No. 203,549

10 Claims. (Cl. 106—181)

The present invention relates to plasticized thermoplastic resin compositions, and more particularly to plasticized vinyl chloride polymer or copolymer compositions.

It is one object of the present invention to provide novel plasticized thermoplastic resin compositions.

It is a further object of this invention to provide a plasticized thermoplastic resin, particularly a vinyl chloride-vinyl acetate copolymer, composition having good tensile strength and flexibility in the form of a film or coating and which exhibits extremely low plasticizer loss on ageing.

Still further objects and advantages of this invention will appear in the following description and the appended claims.

These and other objects of the invention are attained in general, by providing a thermoplastic resin or cellulose derivative composition, for example, a vinyl chloride-vinyl acetate copolymer composition or a cellulose derivative composition comprising a sulfonyl bis aliphatic ester or a mixture of sulfonyl bis aliphatic esters having the general formula:

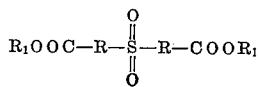

where R is a saturated hydrocarbon radical having from 1 to 3 carbon atoms and $R_1$ is an alkyl radical having from 4 to 16 carbon atoms. The sulfonyl bis aliphatic ester is used in an amount sufficient to plasticize the thermoplastic resin.

The term "thermoplastic resin" as used herein is intended to include the various heat deformable synthetic polymers such as vinyl resins, with the exception of vinyl-diolefin copolymers and diolefin polymers. As examples of thermoplastic resins which are suitably plasticized in accordance with the present invention may be mentioned vinyl resins such as polyvinyl chloride, copolymers of vinyl chloride and vinyl acetate, polyvinyl acetate, and the like. As examples of cellulose derivatives which are suitably plasticized in accordance with the present invention may be mentioned nitrocellulose and ethyl cellulose. The preferred thermoplastic resins for use in the compositions of this invention are polyvinyl chloride and copolymers of vinyl chloride and vinyl acetate. The preferred cellulose derivative is nitrocellulose.

The sulfonyl bis aliphtic esters may be incorporated in the thermoplastic resin or cellulose derivative compositions in a variety of ways known in the art. Thus, they may be incorporated in organosols of the resin or cellulose derivative, or in lacquers of the resin or cellulose derivative, or they may be mixed with the finely divided resin or cellulose derivative to form plastisols or they may be mixed with the finely divided resin or cellulose derivative on a roll mill to form free films.

The amount of sulfonyl bis aliphatic ester used may be varied considerably depending primarily on its compatibility with the resin or cellulose derivative and the properties desired in the coating or film prepared from the composition. The compatibility of the sulfonyl bis aliphatic esters of this invention varies with the particular thermoplastic resin or cellulose derivative employed and the particular ester used. In general, the esters are more compatible with vinyl resins, particularly the vinyl chloride polymers and copolymers, than with cellulose derivatives such as nitrocellulose. In the class of vinyl resins, the esters are generally compatible in all proportions with vinyl chloride-vinyl acetate copolymers and particularly vinyl chloride-vinyl acetate copolymers containing at least 7% of vinyl acetate. The compatibility of the esters with other vinyl resins is generally not as great as in the case of the vinyl chloride-vinyl acetate copolymers. Generally speaking, the lower alkyl esters of the sulfonyl bis aliphatic acids, that is alkyl esters having from 4 to 6 carbon atoms in the alkyl group, have greater compatibility for vinyl resins than the higher alkyl esters. The same trend is apparent with nitrocellulose.

For practical purposes the amount of sulfonyl bis aliphatic ester used should be sufficient to plasticize the resin or cellulose derivative employed in the composition and to provide a compatible composition which is capable of forming clear films, that is, films which are not hazy because of the incompatibility of the ester per se, the precise amount selected being dependent on the desired properties of the films or coatings formed from the composition. The properties desired will govern the amount of the sulfonyl bis aliphatic ester used since if high tensile strength is desired flexibility may have to be sacrificed and smaller amounts of the ester will suffice. Similarly, abrasion resistance is usually obtained at the expense of flexibility and smaller amounts of the ester are used if higher abrasion resistance of the coating or film is desired. On the other hand, if flexibility is of primary importance larger amounts of the ester are used providing the amount used is not so great as to provide an incompatible composition.

With most vinyl thermoplastic resins satisfactory results are obtained by using from about 5 to 50% of the esters of this invention based on the weight of the resin, depending on the particular resin used and the properties of the product formed from the composition. Generally, these amounts are also suitable for nitrocellulose and ethyl cellulose depending on the particular ester used. However, in some instances, especially in fabric coating, it is desirable to use up to 150% of the ester based on nitrocellulose. When free films are desired satisfactory results are generally obtained by using from about 5 to 60% of the sulfonyl bis aliphatic ester based on the weight of the thermoplastic resin.

Various modifying agents may be incorporated in the compositions of this invention, as will be apparent to those skilled in the art, including pigments, fillers, light-stabilizing agents, flame retarding agents, compatible thermosetting or natural resins and the like.

The sulfonyl bis aliphatic esters employed in the compositions of this invention may be prepared in various ways. Methods of preparing the sulfonyl bis aliphatic acids from which the esters are prepared have been described in the literature and the acids so prepared are then suitably esterified with an alkyl monohydric alcohol containing from 4 to 16 carbon atoms to form the desired ester. A particularly suitable method of preparing sulfonyl bis acetic esters comprises first oxidizing thio bis acetic acid, which may be prepared from sodium sulfide and chloracetic acid, in an aqueous solution of potassium permanganate to the corresponding sulfonyl bis acetic acid. The esterification of this acid is then suitably carried out in a Stark and Dean apparatus, the water being removed by azeotropic distillation with benzene. The sulfonyl bis propionic acid is suitably prepared by first hydrolyzing and then oxidizing thio bis ethyl cyanide in an aqueous hydrochloric acid solution containing a halogen such as chlorine or bromine. The corresponding sulfonyl bis propionic acid precipitates out of solution as it is formed and is removed from the liquid phase and dried, after which it is esterified in the normal manner. The sulfonyl bis butyric acid and its ester may be prepared by oxidation of thio bis butyric acid with a halogen such as chlorine or bromine followed by esterification.

As examples of alcohols which are useful in preparing the esters employed herein may be mentioned butyl alcohol, 2-ethyl hexanol, dodecanol, cetyl alcohol and the like.

The preferred sulfonyl bis aliphatic esters for use in the compositions of this invention are sulfonyl bis 2-ethyl hexyl acetate, sulfonyl bis 2-ethyl hexyl propionate and sulfonyl bis 2-ethyl hexyl butyrate. These compounds show less plasticizer loss than di-(2-ethyl hexyl) phthalate when used with vinyl resins and nitrocellulose and have good solvent action for nitrocellulose and vinyl chloride polymers and copolymers.

A further understanding of the compositions of this invention will be obtained from the following specific examples which are intended to illustrate the invention but not to limit the scope thereof, parts and percentages being by weight unless otherwise specified.

Example I

A lacquer was prepared by stirring the following ingredients until a solution was obtained:

| | Parts |
|---|---|
| ½ second nitrocellulose | 15 |
| Sulfony bis 2-ethyl hexyl acetate | 5 |
| Ethyl acetate | 7.95 |
| Butyl acetate | 18.8 |
| Butyl alcohol | 5.3 |
| Denatured alcohol No. 1 | 5.3 |
| Toluol | 42.65 |

The above lacquer was applied on a glass plate in the form of a wet film having a thickness of 0.04 inch. On drying, the film has a thickness of 0.0035 inch and was clear and transparent. The tensile strength of the film was 6300 pounds per square inch and the elongation was 33% as determined on a Scott Tester IP4.

Films were prepared from a similar lacquer using di-(2-ethyl hexyl) phthalate instead of the sulfonyl bis 2-ethyl hexyl acetate.

The dry films from each lacquer were conditioned at a relative humidity of 100% and at a temperature of 44 C. for a period of 20 hours. No plasticizer exudation was noted. When the films were conditioned at the same relative humidity for a period of 26 hours at a temperature of 80° C. the films plasticized with the sulfonyl ester showed a loss of 1% whereas the films plasticized with di-(2-ethyl hexyl) phthalate showed a loss of 2.5%.

Example II

A lacquer was prepared by stirring the following ingredients until a solution was obtained:

| | Parts |
|---|---|
| Copolymer of 90% vinyl chloride and 10% vinyl acetate (having a specific gravity of 1.36 and an intrinsic viscosity in cyclohexanone of 0.79 centipoises) | 15 |
| Sulfonyl bis 2-ethyl hexyl acetate | 7.5 |
| Methyl ethyl ketone | 38.75 |
| Methyl isobutyl ketone | 38.75 |

The above lacquer was applied on a glass plate in the form of a wet film having a thickness of 0.04 inch. On drying, the film had a thickness of 0.0035 inch and was clear and transparent. The film had good tensile strength and flexibility and was comparable in this respect with a similar film plasticized with di-(2-ethyl hexyl) phthalate.

The vinyl chloride-vinyl acetate film plasticized with sulfonyl bis-2-ethyl hexyl acetate showed no plasticizer exudation on exposure to a relative humidity of 100% at 44° C. for a period of 20 hours. On exposure of the film to a relative humidity of 100% at a temperature of 80° C. for 26 hours a 1% loss of plasticizer content was noted compared to a plasticizer loss of 2.5% of a similar film plasticized with di-(2-ethyl hexyl) phthalate.

Various modifications and changes may be made in the compositions of this invention as will be apparent to those skilled in the art to which they appertain without departing from the spirit and intent of this invention. It is to be understood therefore that the present invention is not intended to be limited except by the scope of the appended claims.

What is claimed is:

1. A composition of matter comprising a substance selected from the group consisting of thermoplastic resins, nitrocellulose and ethyl cellulose, and a sulfonyl bis alkyl acetate, in which the alkyl group contains from 4 to 16 carbon atoms, said acetate being present in an amount sufficient to plasticize said substance.

2. A polyvinyl chloride composition comprising a sulfonyl bis alkyl acetate, in which the alkyl group contains from 4 to 16 carbon atoms, in an amount sufficient to plasticize said polyvinyl chloride.

3. A vinyl chloride-vinyl acetate copolymer composition comprising a sulfonyl bis alkyl acetate, in which the alkyl group contains from 4 to 16 carbon atoms, in an amount sufficient to plasticize said copolymer.

4. A nitrocellulose composition comprising a sulfonyl bis alkyl acetate, in which the alkyl group contains from 4 to 16 carbon atoms, in an amount sufficient to plasticize said nitrocellulose.

5. A composition of matter comprising a substance selected from the group consisting of thermoplastic resins, nitrocellulose and ethyl cellulose, and from about 5 to 150% by weight, based on said substance, of a sulfonyl bis alkyl acetate, in which the alkyl group contains from 4 to 16 carbon atoms.

6. A polyvinyl chloride composition comprising from about 5 to 60% by weight, based on the polyvinyl chloride, of a sulfonyl bis alkyl acetate, in which the alkyl group contains from 4 to 16 carbon atoms.

7. A vinyl chloride-vinyl acetate copolymer composition comprising from about 5 to 60% by weight, based on said copolymer, of a sulfonyl bis alkyl acetate, in which the alkyl group contains from 4 to 16 carbon atoms.

8. A composition according to claim 7, but further characterized in that said acetate is sulfonyl bis 2-ethyl hexyl acetate.

9. A nitrocellulose composition comprising from about 5 to 150% by weight, based on said nitrocellulose, of a sulfonyl bis alkyl acetate, in which the alkyl group contains from 4 to 16 carbon atoms.

10. A composition according to claim 9, but further characterized in that the acetate is sulfonyl bis 2-ethyl hexyl acetate.

References Cited in the file of this patent

UNITED STATES PATENTS

| Number | Name | Date |
|---|---|---|
| 2,536,498 | Fraser | Jan. 2, 1951 |